United States Patent
Bin Ismail et al.

(10) Patent No.: US 10,568,311 B2
(45) Date of Patent: Feb. 25, 2020

(54) DUAL-BEARING REEL

(71) Applicant: Shimano Components (Malaysia) SDN. BHD., Pontian, Johor (MY)

(72) Inventors: Mohd Syamsul Johary Bin Ismail, Johor (MY); Abu Supian Bin Ahmad, Johor (MY)

(73) Assignee: SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 0 days.

(21) Appl. No.: 16/279,029

(22) Filed: Feb. 19, 2019

(65) Prior Publication Data

US 2019/0297865 A1     Oct. 3, 2019

(30) Foreign Application Priority Data

Mar. 29, 2018 (JP) .................. 2018-065758

(51) Int. Cl.
*A01K 89/01* (2006.01)
*A01K 89/015* (2006.01)

(52) U.S. Cl.
CPC ...... *A01K 89/0189* (2015.05); *A01K 89/0193* (2015.05)

(58) Field of Classification Search
CPC .......... A01K 89/0189; A01K 89/01901; A01K 89/0193
See application file for complete search history.

(56) References Cited

U.S. PATENT DOCUMENTS

2012/0067993 A1* 3/2012 Nakagawa ....... A01K 89/01901
242/257
2015/0296762 A1* 10/2015 Haraguchi ........... A01K 89/015
242/261
2015/0342167 A1* 12/2015 Takechi ............. A01K 89/0189
242/257

FOREIGN PATENT DOCUMENTS

JP    2010-172203 A    8/2010
JP    2015-163055 A    9/2015

* cited by examiner

*Primary Examiner* — Emmanuel M Marcelo
(74) *Attorney, Agent, or Firm* — United IP Counselors, LLC

(57) ABSTRACT

A dual-bearing reel having a clutch mechanism for connecting a handle and a spool and releasing a connection between the handle and the spool is disclosed. The dual-bearing reel includes a metal frame, a clutch yoke, and a guide member made of resin. The metal frame supports a handle shaft of the handle. The clutch yoke is configured to switch the clutch mechanism between a connected state and a disconnected state. The guide member includes a main body part to be mounted on the frame, and a support part integrally formed with the main body part to guide the clutch yoke in an axial direction along an axis of the spool.

8 Claims, 5 Drawing Sheets

DUAL-BEARING REEL

CROSS-REFERENCE TO RELATED APPLICATIONS

This application claims priority to Japanese Patent Application No. 2018-065758, filed Mar. 29, 2018. The contents of that application are incorporated by reference herein in their entirety.

BACKGROUND

Technical Field

The present disclosure relates to a dual-bearing reel, and more particularly to a dual-bearing reel having a clutch mechanism for connecting a handle and a spool and releasing the connection between the handle and the spool.

Background Information

A clutch mechanism is disposed between a handle and a spool in a dual-bearing reel (refer to, for example, Japanese Laid-open Patent Application Publication No. 2010-172203). The clutch mechanism connects and disconnects the handle and the spool. The clutch mechanism includes a clutch yoke and a support member for supporting the clutch yoke.

For example, Japanese Laid-open Patent Application Publication No. 2010-172203 discloses a support member in which two support parts and a main body part to be attached to a frame are integrally formed. In Japanese Laid-open Patent Application Publication No. 2015-163055, two support members are directly attached to a frame. Since it is necessary for these support members to support a clutch yoke that moves a loaded pinion gear in the direction of a spool shaft, the support members are generally made of metal.

BRIEF SUMMARY

In a conventional dual-bearing reel, a support member made of metal might corrode when water, salt water or the like adheres thereto. Here, when there is corrosion of the metal support member, the strength and shape of the metal support member are impaired. In addition, the support member and the clutch yoke are stuck due to the salt deposited thereto, or the surface roughness of the support member increases. In other words, with the conventional support member, there is a possibility that the clutch yoke cannot be suitably guided in the axial direction.

The present disclosure has been made in view of the aforementioned drawback, and an object of the present disclosure is to provide a dual-bearing reel capable of suitably guiding a clutch yoke.

A dual-bearing reel according to an aspect of the present disclosure includes a clutch mechanism for connecting a handle and a spool and releasing the connection between the handle and the spool. The dual-bearing reel of the present disclosure includes a metal frame, a clutch yoke, and a guide member made of resin.

The metal frame supports a handle shaft of the handle. The clutch yoke is configured to switch the clutch mechanism between a connected state and a disconnected state. The resin guide member has a main body part mounted on the frame and a support part, which is integrally formed with the main body part, for guiding the clutch yoke in the axial direction.

In the present dual-bearing reel, the support part is made of resin, and therefore it is possible to prevent corrosion of the support part. That is, in the present dual-bearing reel, deformation of the support part and reduction in the strength of the support part due to corrosion do not occur; hence, the clutch yoke can be suitably guided by the support part. In addition, it is possible to prevent the support part and the clutch yoke from becoming stuck by deposits and suppress an increase in the surface roughness of the support part, and therefore the clutch yoke can be suitably guided by the support part.

Further, in the present dual-bearing reel, corrosion of the main body part can be prevented since the main body part is made of resin. With this configuration, there is no occurrence of a change in the posture of the support part due to corrosion of the main body part, whereby the clutch yoke can be more suitably guided by the support part.

In the dual-bearing reel according to another aspect of the present disclosure, the support part has a guide shaft. The guide shaft protrudes from the main body part. At least a portion of the guide shaft has a substantially cylindrical shape. In this case, a reinforcing member is disposed on an inner peripheral portion of the guide shaft.

With this configuration, the reinforcing member is disposed on the inner peripheral portion of the guide shaft, whereby the strength of the guide shaft can be improved. Therefore, the clutch yoke can be suitably guided by the support part (guide shaft).

In the dual-bearing reel according to yet another aspect of the present disclosure, the reinforcing member is preferably made of metal. With this configuration, the strength of the protruding portion can be further improved, and the clutch yoke can be suitably guided by the support part (protruding portion).

A dual-bearing reel according to yet another aspect of the present disclosure further includes a clutch cam configured to move the clutch yoke in the axial direction. The main body part is disposed between the frame and the clutch cam.

With such a configuration, the clutch yoke can be suitably guided by the support part (protruding portion).

According to the present invention, it is possible to suitably guide the clutch yoke in the dual-bearing reel.

BRIEF DESCRIPTION OF THE DRAWINGS

Referring now to the attached drawings which form a part of this original disclosure.

DETAILED DESCRIPTION OF EMBODIMENTS

Figure 1:
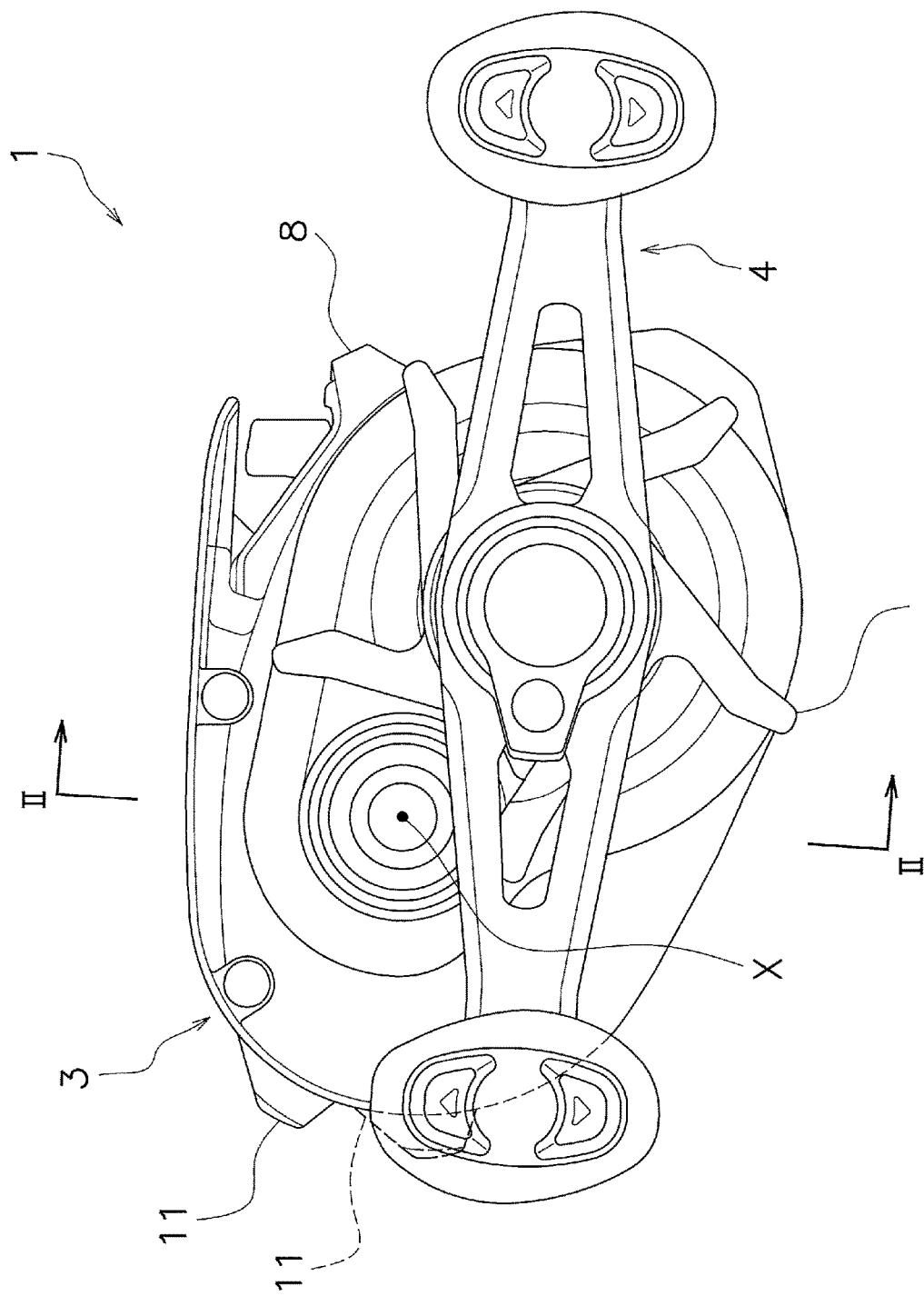
FIG. 1 is a side view of a dual-bearing reel of an embodiment of the present disclosure.
Figure 2:
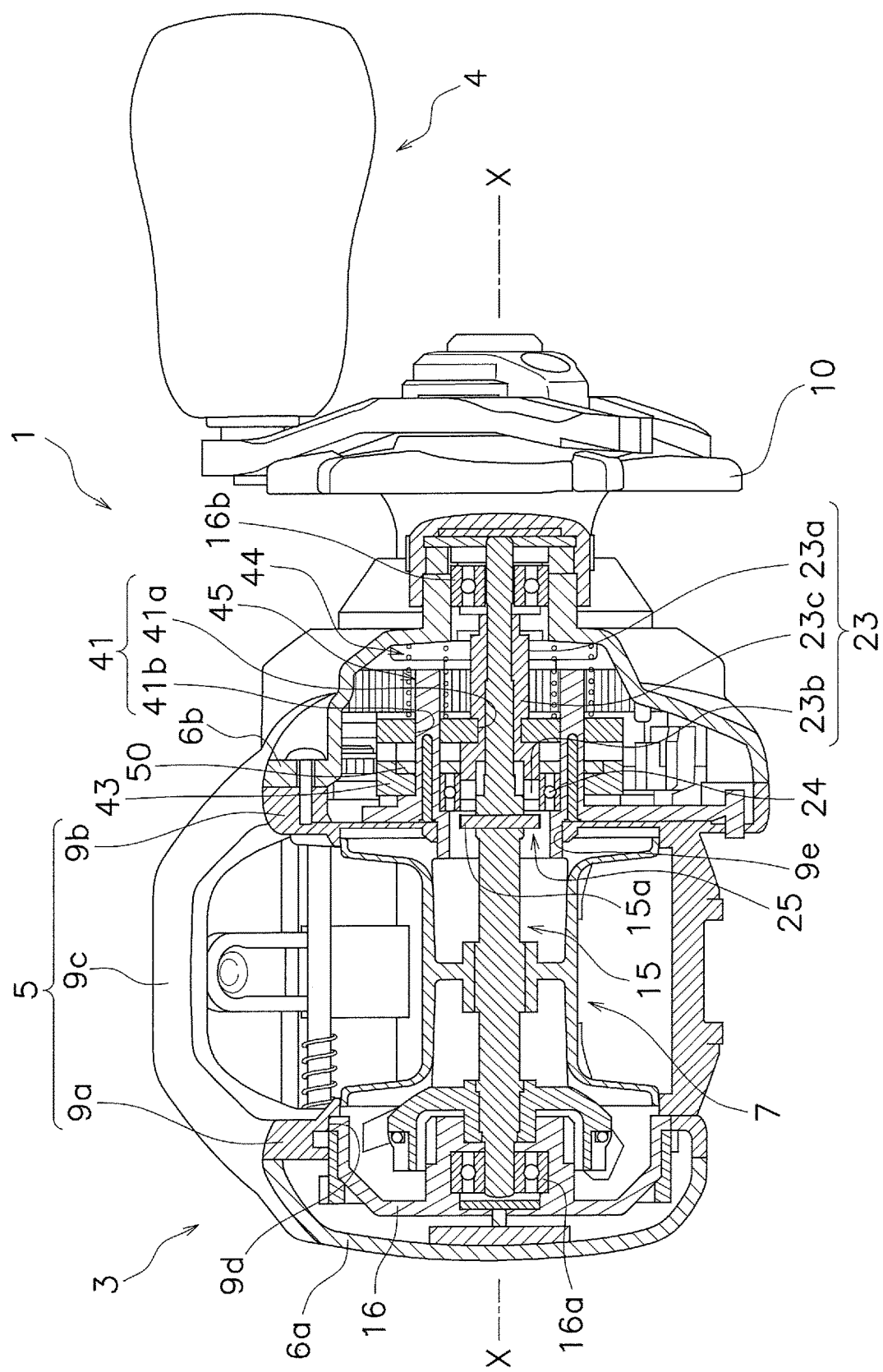
FIG. 2 is a cross-sectional view of the dual-bearing reel taken along the section line II-II of FIG. 1.

As illustrated in FIG. 1, a dual-bearing reel 1 of an embodiment of the present disclosure includes a reel body 3 that can be mounted on a fishing rod, a handle 4 disposed on the side of the reel body 3 for rotating a spool, and a spool 7 (refer to FIG. 2) rotatably mounted on the reel body 3. As illustrated in FIG. 2, the dual-bearing reel 1 further includes a clutch mechanism 25 capable of connecting the handle 4 and the spool 7 and releasing the connection between the handle 4 and the spool 7.

It should be noted that in the following description, the rotational axis of the spool 7 is referred to as a "spool axis X". Also, the term "spool shaft direction" indicates an extending direction of the spool axis X and a direction along the spool axis x, whereas the term "circumferential direction" (rotational direction) indicates a circumferential direction about the spool axis X. Additionally, a direction away from the spool axis X is referred to as a "radial direction".

<Reel Body>

As illustrated in FIG. 2, the reel body 3 includes a frame 5 made of metal, a first side cover 6a and a second side cover 6b mounted on the frame 5 so as to cover both sides of the frame 5, and a front cover 8 (refer to FIG. 1) mounted on the front of the frame 5.

The frame 5 includes a first side plate 9a and a second side plate 9b which are disposed apart at an interval from each other. The first side plate 9a and the second side plate 9b are coupled to each other through a coupling part 9c.

The first side plate 9a has a first opening 9d. A bearing accommodating part 16 is fixed to the first opening 9d. A clutch control device 30 (to be described) is mounted on the second side plate 9b. The second side plate 9b has a second opening 9e through which a spool shaft 15 passes through. The first side cover 6a is attached to the first side plate 9a of the frame 5. The second side cover 6b is attached to the second side plate 9b of the frame 5.

Figure 3:
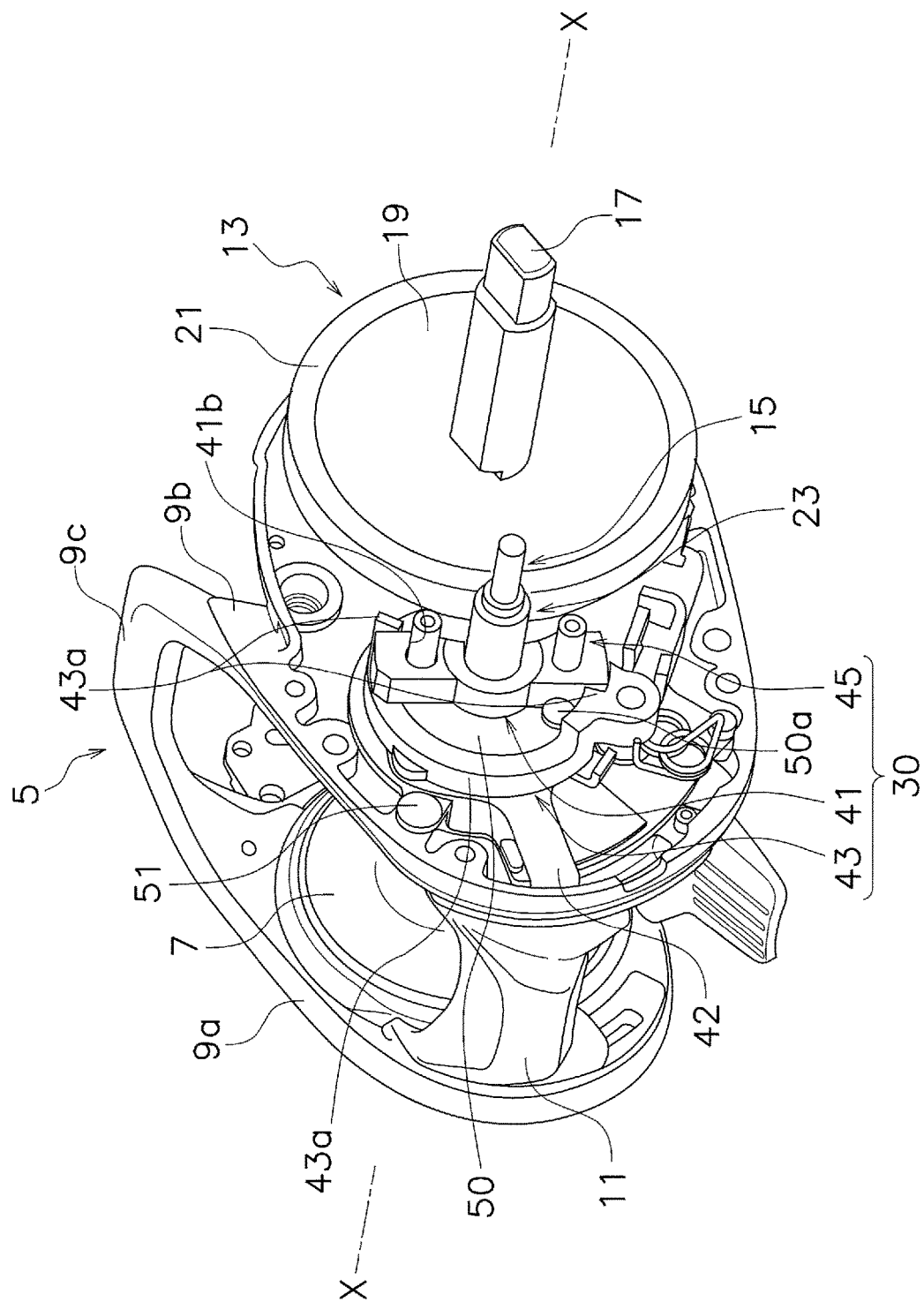
FIG. 3 is a perspective view of a clutch control device disposed in a frame of the dual-bearing reel.

As illustrated in FIG. 3, the spool 7 and a clutch operating member 11 are disposed in the frame 5, for example, between the first side plate 9a and the second side plate 9b. Furthermore, for example, a rotation transmission mechanism 13 and the clutch control device 30, which will be described later, are disposed between the frame 5 and the second side cover 6b. That is, the dual-bearing reel 1 further includes the clutch operating member 11, the rotation transmission mechanism 13, and the clutch control device 30.

<Spool>

As illustrated in FIGS. 2 and 3, the spool 7 is rotatably disposed between the first side plate 9a and the second side plate 9b. The spool 7 is fixed to the spool shaft 15 so as to be integrally rotatable with the spool shaft 15.

The spool shaft 15 is rotatable with respect to the reel body 3. For example, as illustrated in FIG. 2, one end portion of the spool shaft 15 is rotatably supported with respect to the first side plate 9a via a bearing 16a disposed in the bearing accommodating part 16. The other end portion of the spool shaft 15 is rotatably supported by the second side plate 9b via a bearing 16b. An engaging pin 15a constituting the clutch mechanism 25 is attached to the spool shaft 15.

<Clutch Operating Member>

As shown in FIGS. 1 and 3, the clutch operating member 11 is disposed at the rear part of the reel body 3. The clutch operating member 11 is coupled to the clutch control device 30. The clutch operating member 11 is movable between a clutch ON position (refer to the solid line in FIG. 1) and a clutch OFF position (refer to the broken line in FIG. 1). The clutch operating member 11 is also used as a thumb rest when thumbing.

<Rotation Transmission Mechanism>

The rotation transmission mechanism 13 is a mechanism for transmitting the rotational force from the handle 4 to the spool 7. As illustrated in FIG. 3, for example, the rotation transmission mechanism 13 includes a handle shaft 17, a drag mechanism 19, a drive gear 21, and a pinion gear 23 (refer to FIG. 2)

The handle 4 is mounted on the handle shaft 17. The handle shaft 17 is rotatably supported by the metal frame 5. More specifically, the handle shaft 17 is rotatably supported by the second side cover 6b and the metal frame 5. For example, the handle shaft 17 is rotatably supported by the second side cover 6b via a one-way clutch (not shown) that prevents the handle shaft 17 from rotating in a line delivering direction. In addition, the handle shaft 17 is rotatably supported by the second side plate 9b via a bearing (not shown).

The drag mechanism 19 transmits the rotation of the handle shaft 17 to the drive gear 21 and applies a brake to the rotation of the spool 7 at the time of line delivering. As illustrated in FIG. 3, the drag mechanism 19 is disposed between the handle shaft 17 and the drive gear 21.

The drive gear 21 is rotatably mounted on the handle shaft 17. As illustrated in FIG. 3, the rotation of the handle shaft 17 is transmitted to the drive gear 21 via the drag mechanism 19. In this embodiment, a helical gear is used as the drive gear 21. Further, when a torque of a predetermined value or more acts on the spool 7 at the time of line delivering, the drag mechanism 19 operates and the drive gear 21 rotates relative to the handle shaft 17.

The pinion gear 23 transmits the rotation of the drive gear 21 to the spool shaft 15. As illustrated in FIGS. 2 and 3, the pinion gear 23 has a substantially tubular shape and is disposed on the outer periphery of the spool shaft 15.

As illustrated in FIG. 2, the pinion gear 23 includes a helical toothed part 23a, an engagement groove 23b, and a small diameter part 23c. The toothed part 23a meshes with the drive gear 21.

The engagement groove 23b is formed at the end portion of the pinion gear 23 and extends in the radial direction. An outer peripheral surface of the cylindrical portion formed with the engagement groove 23b is rotatably supported by a guide member 45 (to be described) via a bearing 24 (refer to FIG. 2). The small diameter part 23c is formed between the toothed part 23a and the engagement groove 23b. A clutch yoke 41 (to be described) is engaged with the small diameter part 23c. The clutch yoke 41 is an example of a switching means. The guide member 45 is an example of a guiding means.

<Clutch Mechanism>

The clutch mechanism 25 is configured to connect the handle 4 and the spool 7 and to release the connection between the handle 4 and the spool 7. As illustrated in FIG. 2, the clutch mechanism 25 is composed of the engagement groove 23b of the pinion gear 23 and the engaging pin 15a of the spool shaft 15.

For example, when the pinion gear 23 moves in a direction away from the spool 7 along the spool shaft 15 whereby the engagement groove 23b and the engaging pin 15a of the spool shaft 15 are disengaged, the clutch mechanism 25 is brought into the clutch OFF state (disengaged state). In this case, the spool 7 becomes freely rotatable.

On the other hand, when the pinion gear 23 moves in a direction approaching the spool 7 along the spool shaft 15 whereby the engagement groove 23b is engaged with the engaging pin 15a, the clutch mechanism 25 is brought into the clutch ON state (engaged state). In this case, the spool 7 rotates in conjunction with the rotation of the handle shaft 17.

<Clutch Control Device>

The clutch control device 30 is configured to control the clutch mechanism 25 according to the operation of the clutch operating member 11. As illustrated in FIG. 3, the clutch control device 30 includes the clutch yoke 41, a clutch cam 43, and the guide member 45 made of resin.

(Clutch Yoke)

The clutch yoke 41 is for switching the clutch mechanism 25 to a clutch ON state and a clutch OFF state. As illustrated in FIG. 3, the clutch yoke 41 is guided by the clutch cam 43 and the guide member 45 in the spool shaft direction.

As illustrated in FIG. 2, the clutch yoke 41 includes an engagement recess 41a engageable with the pinion gear 23 and a pair of guide holes 41b. The engagement recess 41a is engaged with the small diameter part 23c of the pinion gear 23.

The pair of guide holes 41b penetrate the clutch yoke 41 in the spool shaft direction. A guide shaft 48 (to be described) is inserted through each guide hole 41b. Both end portions of the clutch yoke 41 are engaged with the clutch cam 43.

(Clutch Cam)

The clutch cam 43 is a cam for moving the clutch yoke 41 in the spool shaft direction. The clutch cam 43 is disposed on the guide member 45 so as to be rotatable about the spool axis X.

A coupling member 42 is attached to the clutch cam 43. The coupling member 42 couples the clutch operating member 11 and the clutch cam 43. When the clutch operating member 11 is operated, the clutch cam 43 rotates via the coupling member 42.

The clutch cam 43 is disposed on the outer periphery of a second cylindrical portion 46c (to be described) of the guide member 45. The clutch cam 43 is rotatable around the second cylindrical portion 46c. The clutch cam 43 is positioned in the axial direction by a positioning member 50. The positioning member 50 is fixed to the second side plate 9b by a fixing member, for example, a screw member 50a.

The clutch cam 43 includes a cam portion 43a for guiding the clutch yoke 41 in the axial direction. When the clutch cam 43 is rotated by the operation of the clutch operating member 11, the cam portion 43a presses both end portions of the clutch yoke 41. Then, both end portions of the clutch yoke 41 move in the spool shaft direction away from the spool 7. As a result, the clutch mechanism 25 is switched from the clutch ON state to the clutch OFF state.

On the other hand, when a clutch returning mechanism (not shown) is operated by the operation of the handle 4, the clutch cam 43 rotates in a direction opposite to the above-mentioned rotating direction. Then, both end portions of the clutch yoke 41 move in the spool shaft direction approaching the spool 7. As a result, the clutch mechanism 25 is switched from the clutch OFF state to the clutch ON state.

(Guide Member)

Figure 4:
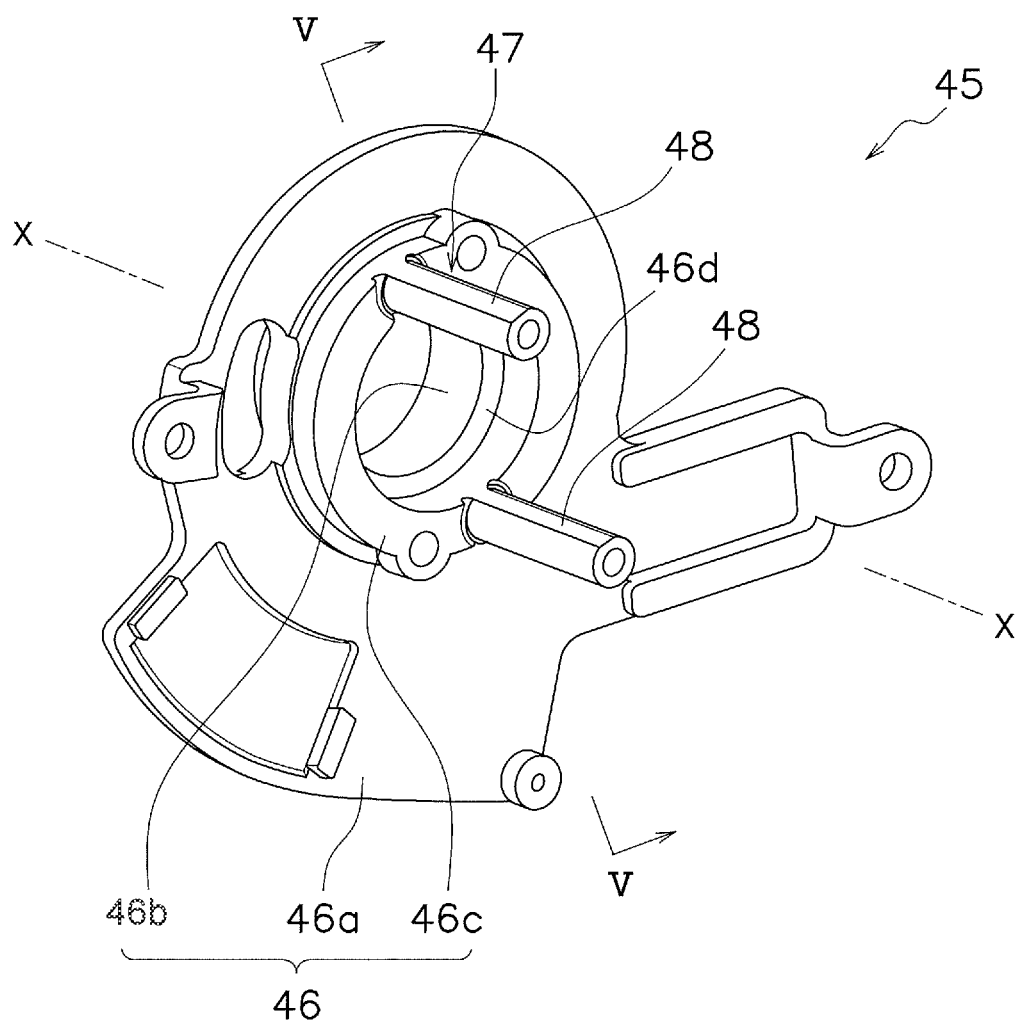
FIG. 4 is a perspective view of a guide member.
Figure 5:
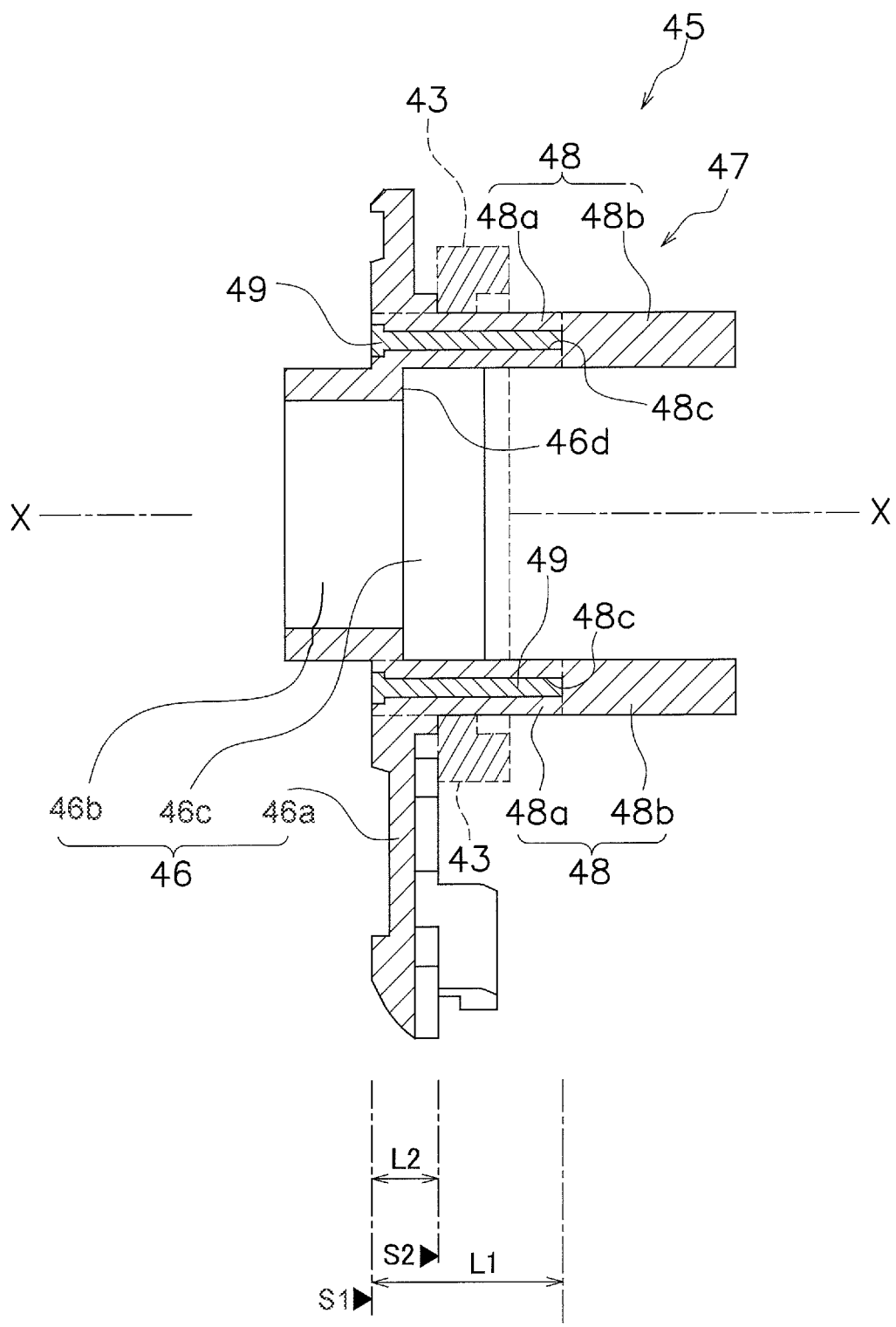
FIG. 5 is a cross-sectional view of the guide member taken along the section line V-V in FIG. 4.

The guide member 45 guides the clutch yoke 41 in the spool shaft direction. As illustrated in FIG. 3, the guide member 45 is attached to the frame 5. As illustrated in FIGS. 4 and 5, the guide member 45 includes a main body part 46 and a guide part 47 (an example of a support part). The guide member 45 further includes a reinforcing member 49 (refer to FIG. 5). The reinforcing member 49 is an example of a reinforcing means.

As illustrated in FIG. 3, the main body part 46 is attached to the frame 5. As illustrated in FIGS. 4 and 5, the main body part 46 includes a fixing portion 46a, a first cylindrical portion 46b, and a second cylindrical portion 46c.

The fixing portion 46a has a substantially plate shape. The fixing portion 46a is disposed between the frame 5 and the clutch cam 43. The fixing portion 46a is fixed to the frame 5, for example, to the second side plate 9b by a fixing means, for example, a screw member 51 (refer to FIG. 3).

The first cylindrical portion 46b is integrally formed with the fixing portion 46a. The first cylindrical portion 46b penetrates the fixing portion 46a in the spool shaft direction and protrudes from the fixing portion 46a. The first cylindrical portion 46b is disposed in the second opening 9e (refer to FIG. 2) provided in the second side plate 9b. The spool shaft 15 is disposed on an inner periphery of the first cylindrical portion 46b.

The second cylindrical portion 46c is integrally formed with the fixing portion 46a. The second cylindrical portion 46c couples the pair of guide shafts 48 (to be described) in the circumferential direction. The clutch cam 43 is disposed on an outer peripheral portion of the second cylindrical portion 46c (refer to FIG. 3).

As illustrated in FIG. 5, an inner diameter of the second cylindrical portion 46c is larger than an inner diameter of the first cylindrical portion 46b. The bearing 24 (refer to FIG. 2) for supporting the pinion gear 23 is disposed on an annular stepped portion 46d formed by the first cylindrical portion 46b and the second cylindrical portion 46c.

As illustrated in FIGS. 4 and 5, the guide part 47 is integrally formed with the main body part 46. The guide part 47 guides the clutch yoke 41 in the spool shaft direction. The guide part 47 includes the pair of guide shafts 48 (an example of at least two protruding portions) protruding from the main body part 46.

The pair of guide shafts 48 is integrally formed with the main body part 46, for example, with the fixing portion 46a. The pair of guide shafts 48 protrudes in the spool shaft direction from the fixing portion 46a, respectively. The pair of guide shafts 48 is disposed apart at an interval from each other in the circumferential direction.

The pair of guide shafts 48 is inserted through the pair of guide holes 41b of the clutch yoke 41, respectively. In this state, a coil spring 44 is disposed on an outer periphery of each guide shaft 48 (refer to FIG. 2). For example, the coil spring 44 is disposed in a compressed state on the outer periphery of each guide shaft 48 between the clutch yoke 41 and the second side cover 6b.

For example, when the clutch cam 43 is rotated by the operation of the clutch operating member 11 under a state where the clutch mechanism 25 is set in the clutch ON state, the clutch yoke 41 is guided by the pair of guide shafts 48 and moves in the spool shaft direction away from the spool 7. As a result, the clutch mechanism 25 is switched from the clutch ON state to the clutch OFF state.

On the other hand, when the clutch returning mechanism (not shown) is operated by the operation of the handle 4, the clutch yoke 41 is urged by the coil spring 44 to move along the pair of guide shafts 48 in the spool shaft direction approaching the spool 7. As a result, the clutch mechanism 25 returns from the clutch OFF state to the clutch ON state.

Hereinafter, a configuration of the guide shaft 48 will be described in detail. As illustrated in FIG. 5, at least a portion of the guide shaft 48 has a substantially cylindrical shape. The reinforcing member 49 is disposed on the inner peripheral portion of the guide shaft 48.

In this embodiment, a portion of the guide shaft 48 has a substantially cylindrical shape. The guide shaft 48 includes a first shaft portion 48a formed hallow and a second shaft portion 48b formed solid. The first shaft portion 48a is integrally formed with the fixing portion 46a and protrudes therefrom in the spool shaft direction. A base end portion of the first shaft portion 48a corresponds to a base end portion of the guide shaft 48.

The first shaft portion 48a has a substantially cylindrical shape. The reinforcing member 49 is disposed in the inner peripheral portion of the first shaft portion 48a, that is, a hole portion 48c. The hole portion 48c of the first shaft portion 48a opens to the second side plate 9b side of the frame 5.

The second shaft portion 48b is integrally formed with the first shaft portion 48a. The second shaft portion 48b extends in the spool shaft direction from the distal end portion of the first shaft portion 48a. The distal end portion of the second shaft portion 48b corresponds to a distal end portion of the guide shaft 48. The second shaft portion 48b has a solid rod shape.

The reinforcing member 49 is a member for reinforcing the strength and rigidity of the guide shaft 48. The reinforcing member 49 is made of metal. For example, the reinforcing member 49 is a pin member made of metal.

The reinforcing member 49 is disposed on the inner peripheral portion of the guide shaft 48 at the base end side of the guide shaft 48. The reinforcing member 49 is fitted into the hole portion 48c of the first shaft portion 48a. Specifically, the reinforcing member 49 is fitted from the side of the second side plate 9b of the frame 5 toward the hole portion 48c of the first shaft portion 48a. With this configuration, when the guide member 45 is attached to the second side plate 9b of the frame 5, the hole portion 48c of the first shaft portion 48a and the reinforcing member 49 are covered by the second side plate 9b. Therefore, the adhesion of water, salt water or the like can be prevented even if the reinforcing member 49 is made of metal.

In this embodiment, an axial length L1 of the reinforcing member 49 is longer than an axial distance L2, which is a distance between an opposing surface S1 of the fixing portion 46a opposed to the second side plate 9b and a contact surface S2 where the clutch cam 43 abuts against the clutch yoke 41 in the clutch ON state. As a result, the fixed end side of the guide shaft 48 can be reliably reinforced by the reinforcing member 49.

In the dual-bearing reel 1 described above, since the guide member 45 (the main body part 46 and the guide part 47) is made of resin, corrosion of the guide part 47 can be prevented. That is, in the dual-bearing reel 1, deformation of the guide part 47 due to corrosion and a reduction in the strength of the guide part 47 caused by corrosion do not occur, whereby the clutch yoke 41 can be suitably guided by the guide part 47. In addition, it is possible to prevent the guide part 47 and the clutch yoke 41 from becoming stuck and suppress the increase in the surface roughness of the guide part 47, whereby the clutch yoke 41 can be suitably guided by the guide part 47.

Further, in the present dual-bearing reel 1, the guide part 47 is integrally formed with the main body part 46, and therefore the use of a metallic fixing member for fixing the guide part 47 to the main body part 46 as in the conventional technique is not necessary. That is, in the dual-bearing reel 1, since there is no occurrence of a change in the posture of the guide part 47 caused by the corrosion of the metallic fixing member, the clutch yoke 41 can be more suitably guided by the guide part 47.

Furthermore, in the present dual-bearing reel 1, since the reinforcing member 49 is disposed on the inner peripheral portion of the guide shaft 48, the strength of the guide shaft 48 can be improved. This configuration allows the clutch yoke 41 to be suitably guided by the guide shaft 48.

Other Embodiments

One embodiment of the present disclosure has been described above; however, the present disclosure is not limited to the above embodiment, and various modifications can be made without departing from the scope of the present disclosure.

(a) The above embodiment has exemplified the construction that a portion of the guide shaft 48 has a substantially cylindrical shape; however, the entire guide shaft 48 can have a substantially cylindrical shape.

(b) The above embodiment has exemplified the construction that the reinforcing member 49 is disposed on both of the pair of guide shafts 48; however, the reinforcing member 49 can be disposed only on one of the pair of guide shafts 48. In addition, the reinforcing member 49 can be integrally formed with the metal frame 5.

What is claimed is:

1. A dual-bearing reel having a clutch mechanism for connecting a handle and a spool and releasing a connection between the handle and the spool, the dual-bearing reel comprising:
a metal frame supporting a handle shaft of the handle;
a clutch yoke configured to switch the clutch mechanism between a connected state and a disconnected state; and
a guide member made of resin that includes a main body part to be mounted on the frame, and a support part integrally formed with the main body part to guide the clutch yoke in an axial direction along an axis of the spool.

2. The dual-bearing reel according to claim 1, wherein
the support part includes a guide shaft, at least a portion of the guide shaft having a cylindrical shape and protruding from the main body part, and
the guide shaft has a reinforcing member on an inner peripheral portion of the guide shaft.

3. The dual-bearing reel according to claim 2, wherein the reinforcing member is made of metal.

4. The dual-bearing reel according to claim 1, further comprising
a clutch cam configured to move the clutch yoke in the axial direction, wherein
the main body part is disposed between the frame and the clutch cam.

5. The dual-bearing reel according to claim 1, wherein
the main body part includes a first plate-shaped portion and a second cylindrical portion, and
the support part is disposed on the cylindrical portion.

6. The dual-bearing reel according to claim 2, wherein
the clutch yoke includes a guide hole, and
the guide shaft of the support part is inserted to the guide hole of the clutch yoke.

7. The dual-bearing reel according to claim 2, wherein
the guide shaft includes a first shaft portion and a second shaft portion, the first shaft portion having a hole inside thereof, and
the reinforcing member is disposed in the hole.

8. The dual-bearing reel according to claim 7, wherein
the first shaft portion is disposed between the frame and the second shaft portion.

* * * * *